United States Patent
Yamada

(10) Patent No.: US 9,893,980 B2
(45) Date of Patent: Feb. 13, 2018

(54) SERVER SYSTEM, SERVER, SERVER CONTROL METHOD, AND NON-TRANSITORY COMPUTER-READABLE MEDIUM CONTAINING SERVER CONTROL PROGRAM

(71) Applicant: NEC Corporation, Tokyo (JP)

(72) Inventor: Taketo Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 545 days.

(21) Appl. No.: 14/408,921

(22) PCT Filed: Jan. 28, 2013

(86) PCT No.: PCT/JP2013/000440
§ 371 (c)(1),
(2) Date: Dec. 17, 2014

(87) PCT Pub. No.: WO2013/190737
PCT Pub. Date: Dec. 27, 2013

(65) Prior Publication Data
US 2015/0142921 A1    May 21, 2015

(30) Foreign Application Priority Data
Jun. 19, 2012    (JP) ................................ 2012-137858

(51) Int. Cl.
*G06F 15/16* (2006.01)
*H04L 12/733* (2013.01)
(Continued)

(52) U.S. Cl.
CPC ........ *H04L 45/126* (2013.01); *H04L 67/1002* (2013.01); *H04L 67/32* (2013.01); *H04L 69/40* (2013.01)

(58) Field of Classification Search
CPC ... H04L 45/126; H04L 67/1002; H04L 67/32; H04L 69/40
(Continued)

(56) References Cited

U.S. PATENT DOCUMENTS 5,608,865 A * 3/1997 Midgely ............. G06F 11/2028
707/999.2
5,987,621 A * 11/1999 Duso .................... G06F 11/2023
348/E5.008

(Continued)

FOREIGN PATENT DOCUMENTS

JP    2000-099435 A1    4/2000
JP    2003-143634 A1    5/2003
(Continued)

OTHER PUBLICATIONS

International Search Report, Corresponding to PCT/JP2013/000440, dated Mar. 12, 2013, 2 pages.
(Continued)

*Primary Examiner* — Imad Hussain
(74) *Attorney, Agent, or Firm* — Wilmer Cutler Pickering Hale & Dorr

(57) ABSTRACT

A server system (9) in provided with: a first server (91) that operates in an active mode; and a plurality of second servers (92) that operate in a standby mode as a standby server for the first server (91),
wherein the plurality of second servers (92) includes a location information control unit (921) that, in response to an access from a client, transmits a location information which indicates a location of the client to the first server (91), and a switching processing unit (922) that, upon reception of a switching instruction information transmitted from the first server (91), performs switching so as to cause the second server itself to change its mode from the standby mode to the active
(Continued)

mode, and wherein the first server (91) includes a switching destination determination unit (911) that, on the basis of the location information transmitted by the second server (92), determines, as a switching destination, a second server (92) which constitutes the plurality of second servers (92) and which exists at a location which is nearer a location of a client, which is indicated by the location information, than a location of the first server (91), and a switching instruction unit (912) that transmits a switching instruction information to a second server (92) which is determined as a switching destination by the switching destination determination unit (911).

8 Claims, 5 Drawing Sheets

(51) Int. Cl.
*H04L 29/08* (2006.01)
*H04L 29/14* (2006.01)

(58) Field of Classification Search
USPC .......................................................... 709/219
See application file for complete search history.

(56) References Cited

U.S. PATENT DOCUMENTS

| | | | | |
|---|---|---|---|---|
| 6,253,230 B1* | 6/2001 | Couland | ............. | H04L 12/5601 709/202 |
| 6,421,714 B1* | 7/2002 | Rai | ................. | H04L 12/4633 455/422.1 |
| 6,598,071 B1* | 7/2003 | Hayashi | ............. | H04L 67/1008 370/256 |
| 6,973,057 B1* | 12/2005 | Forslow | ................ | H04L 45/50 370/328 |
| 9,614,958 B2* | 4/2017 | Radermacher | .... | H04M 3/42348 |
| 2002/0133529 A1* | 9/2002 | Schmidt | ................ | G06F 9/4862 718/102 |
| 2003/0149620 A1* | 8/2003 | Gaither | ................. | G06F 9/5061 705/14.11 |
| 2004/0005877 A1* | 1/2004 | Vaananen | ............... | H04L 51/14 455/412.1 |
| 2004/0088142 A1* | 5/2004 | Ashley | ................ | H04L 41/0253 702/184 |
| 2005/0015657 A1 | 1/2005 | Sugiura | | |
| 2006/0085428 A1* | 4/2006 | Bozeman | ........... | G06F 17/30091 |
| 2008/0215680 A1* | 9/2008 | Salesky | ................. | G06F 3/1415 709/204 |
| 2009/0029692 A1* | 1/2009 | Radermacher | .... | H04M 3/42127 455/418 |
| 2010/0115133 A1* | 5/2010 | Joshi | ................. | H04L 29/12792 709/245 |
| 2012/0034906 A1* | 2/2012 | Ueno | ....................... | H04W 4/02 455/414.1 |
| 2015/0256412 A1* | 9/2015 | Dominick | ............... | G06F 9/505 709/203 |

FOREIGN PATENT DOCUMENTS

| | | |
|---|---|---|
| JP | 2005-018510 A1 | 1/2005 |
| JP | 2006-332837 A1 | 12/2006 |
| JP | 2007-133713 A | 5/2007 |
| JP | 2009-252075 A | 10/2009 |
| JP | 2009-252108 A | 10/2009 |
| JP | 2010-252273 A1 | 11/2010 |
| JP | 2011-071620 A | 4/2011 |

OTHER PUBLICATIONS

Japanese Office Action issued by the Japan Patent Office for Application No. 2014-521205 dated Mar. 8, 2016 (3 pages).

* cited by examiner

SERVER SYSTEM, SERVER, SERVER CONTROL METHOD, AND NON-TRANSITORY COMPUTER-READABLE MEDIUM CONTAINING SERVER CONTROL PROGRAM

CROSS-REFERENCE TO RELATED APPLICATIONS

The present application is a national stage application of International Application No. PCT/JP2013/000440 entitled "Server System, Server, Server Control Method, and Non-Transitory Computer-Readable Medium Containing Server Control Program," filed on Jan. 28, 2013, which claims the benefit of priority from Japanese Patent Application No. JP2012-137858, filed on Jun. 19, 2012, the disclosures of which are incorporated herein in their entirety by reference thereto.

TECHNICAL FIELD

The present invention relates to a server system, a server, a server control method, and a non-transitory computer-readable medium containing a server control program. In particular, the present invention relates to a technology which enables realization of comfortable server's responses to a client in a system in which an active-mode server and a plurality of standby-mode servers operate.

BACKGROUND ART

In recent years, demands for bringing office works processed by a personal computer (hereinafter, also referred to as a "PC") to the cloud through the use of a virtual desktop have been rapidly increased, and users thereof also tend to grow. This virtual desktop is a screen image resulting from aggregating a desktop environment, which is a base of a desktop screen image, on a server installed at a distant data center or the like by utilizing virtualization technologies. A user enters a virtual machine provided on the server from a PC operating as a client through a network, and retrieves and operates a desktop screen image. Such a virtual desktop environment allows a substance as a physical computer (client) and a desktop environment to be mutually separated and enables a user to retrieve their own screen image and environment from any one of computers, and flexibly deal with a change, a business trip, working at home, and a free address system. Moreover, the use of such a virtual desktop environment during an overseas business trip, or the like, makes it unnecessary to retain data at a client side and, as a result, brings about enhancement of security with respect to secret information.

When, however, a user utilizes a virtual desktop environment from a distant place, such as a destination of an overseas business trip, communication delay arises. Thus, delay arises in display operation on desktop screen images in executions of various application programs for e-mail, browsing of web pages, and the like, and this delay brings about obstacles to works.

In PTL 1, there has been disclosed a technology for bringing a user copy of an application program stored in a user accommodation data center (DC) positioned at a location A into a user accommodation DC located at a location B. In this technology, it is assumed a case where, after a user has created and used a user copy of an application program at the user accommodation DC located at the location A subsequent to access thereto, a request for the use of the user copy is made to the user accommodation DC located at the location B by the user. In PTL 1, however, there is not disclosed a technology in which, just like an after-mentioned exemplary embodiment of the present invention, switching between an active system and a standby-mode server is performed on the basis of a location information piece indicating the location of a client operated by a user.

CITATION LIST

Patent Literature

[PTL 1] Japanese Unexamined Patent Application Publication No. 2009-252075

SUMMARY OF INVENTION

Technical Problem

As described above, in such a technology disclosed in PTL 1, there is a problem that, when a user accesses a server from a distant place, server's responses are delayed and this delay causes decrease of operational efficiency.

An object of the present invention is to solve the aforementioned problem. That is, an object of the present invention is to provide a server system, a server, and a server control method which enable realization of provision of comfortable server's responses to a user regardless of an access place of the user, and a non-transitory computer-readable medium that contains the server control program.

Solution to Problem

A server system according to a first aspect of the present invention includes a first server that operates in an active mode, and a plurality of second servers that operate in a standby mode as a standby server for the first server. The plurality of second servers includes a location information control module that, in response to an access from a client, transmits a location information which indicates a location of the client to the first serve, and a switching processing module that, upon reception of a switching instruction information transmitted from the first server, performs switching so as to cause the second server itself to change its mode from the standby mode to the active mode. The first server includes a switching destination determination module that, on the basis of the location information transmitted by the second server, determines, as a switching destination, a second server which constitutes the plurality of second servers and which exists at a location which is nearer a location of a client, which is indicated by the location information, than a location of the first server, and a switching instruction module that transmits a switching instruction information to a second server which is determined as a switching destination by the switching destination determination module.

A server according to a second aspect of the present invention operates in an active mode or in a standby mode, and includes: a location information control module that, in the standby mode, in response to an access from a client, transmits a location information which indicates a location of the client to a server which operates in the active mode; a switching processing module that, in the standby mode, upon reception of a switching instruction information transmitted from a server which operates in the active mode, performs switching so as to cause the server itself to change its mode from the standby mode to the active mode; a switching destination determination module that, in the active mode, on the basis a location information transmitted from a server which operates in the standby mode, determines, as a switching destination, a server which operates in the standby mode and which is positioned at a location which is nearer a location of a client, which is indicated by the location information, than a location of the server itself; and a switching instruction module that, in the active mode, transmits a switching instruction information to a server which operates in the standby mode and which is determined as a switching destination by the switching destination determination module.

A server control method according to a third aspect of the present invention is used for controlling a server which operates in an active mode or in a standby mode, and includes: in the standby mode, in response to an access from a client, transmitting a location information which indicates a location of the client to a server which operates in the active mode; in the standby mode, upon reception of a switching instruction information transmitted from a server which operates in the active mode, perform switching so as to cause the controlled server itself to change its mode from the standby mode to the active mode; in the active mode, on the basis a location information transmitted from a server which operates in the standby mode, determining, as a switching destination, a server which operates in the standby mode and which is positioned at a location which is nearer a location of a client, which is indicated by the location information, than a location of the controlled server itself; and in the active mode, transmitting a switching instruction information to a server which operates in the standby mode and which is determined as a switching destination.

A non-transitory computer readable medium according to a fourth aspect of the present invention stores therein a server control program that controls a server which operates in an active mode or in a standby mode, such that the server which operates in an active mode or in a standby mode executes processing including the processes of: in the standby mode, in response to an access from a client, transmitting a location information which indicates a location of the client to a server which operates in the active mode; in the standby mode, upon reception of a switching instruction information transmitted from a server which operates in the active mode, perform switching so as to cause the controlled server itself to change its mode from the standby mode to the active mode; in the active mode, on the basis a location information transmitted from a server which operates in the standby mode, determining, as a switching destination, a server which operates in the standby mode and which is positioned at a location which is nearer a location of a client, which is indicated by the location information, than a location of the controlled server itself; and in the active mode, transmitting a switching instruction information to a server which operates in the standby mode and which is determined as a switching destination.

Advantageous Effects of Invention

According to each of the aforementioned aspects of the present invention, it is possible to provide a server system, a server, and a server control method which enable realization of provision of comfortable server's responses to a user regardless of an access place of the user, and a non-transitory computer-readable medium containing the server control program.

DESCRIPTION OF EMBODIMENTS

Figure 1:
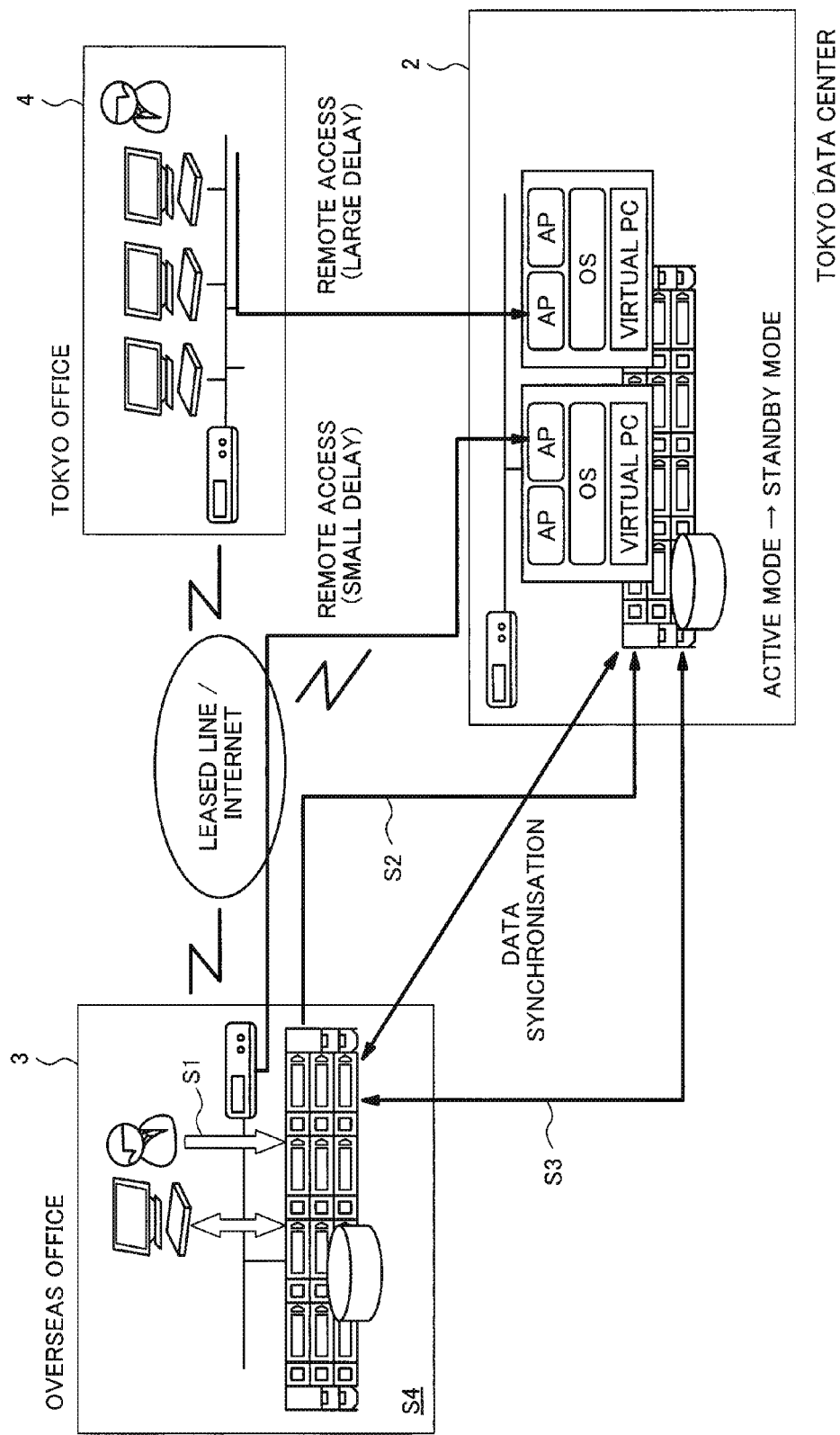
FIG. 1 is a conceptual diagram of a client server system according to an exemplary embodiment of the present invention.

The outline of a client server system 1 according to an exemplary embodiment of the present invention will be described with reference to FIG. 1. FIG. 1 is a conceptual diagram of the client server system 1 according to this exemplary embodiment of the present invention.

This client server system 1 includes a Tokyo data center 2, an overseas office 3, and a Tokyo office 4. These individual bases 2 to 4 are connected to one another via a network (a leased line or the Internet).

In FIG. 1, there is illustrated an example in which a virtual server is installed in each of the Tokyo data center 2 in Japan and the overseas office 3. In addition, in FIG. 1, bases other than the Tokyo data center 2, the overseas office 3, and the Tokyo office 4, as well as virtual servers each installed in a corresponding one of the bases, are omitted form illustration.

The individual virtual servers mutually perform synchronization of data items and share the data items. In this exemplary embodiment, it is assumed that, in an initial state, the virtual server of the Tokyo data center 2 operates as an active-mode server, and the virtual server of each of the other bases operates as a standby-mode server. That is, in this exemplary embodiment, a case where, in an initial state, data items are synchronized from the virtual server in the Tokyo data center 2 operating as an active-mode server to other virtual servers each operating as a standby-mode server is illustrated as an example.

This data synchronization may be performed through a method optionally employed. For example, the data synchronization may be performed by using a difference backup method. Specifically, an active-mode virtual server constantly transmits difference information, which indicate differences regarding data which are generated when the data is written into a database, to each of standby-mode virtual servers. Further, each of the standby-mode virtual servers receives the difference information having been transmitted from the active-mode virtual server, and performs updating for differences indicated by the difference information such that updating therefor in its database are synchronized with that in a database of the active-mode virtual server. In this way, each of the stand-by mode virtual servers becomes in a state in which it contains data items for backup, and this operation enables realization of an improvement of the maintainability of data. In this operation, for example, a propagation function implemented in EXPRESSCLUSTER (registered trademark), which is a piece of middleware that realizes a multiplexed data backup by using a plurality of servers, may be utilized. Moreover, as a file system, a file management system having a large capacity and high availability may be realized by utilizing Zettabyte File System (ZFS).

A user who desires to be provided with a virtual desktop service from a virtual server needs to access the virtual server operating as an active-mode server in the Tokyo data center 2. When the user accesses, from the Tokyo office 4, the virtual server of the Tokyo data center 2 which is installed in a country the same as a country where the Tokyo office 4 is sited, communication delay is small. When, however, the user accesses, from the overseas office 3, the virtual server of the Tokyo data center 2 which is installed in a country different from a country where the overseas office 3 is sited, communication delay is large. Thus, when the user accesses the virtual server of the Tokyo data center 2 from the overseas office 3 during a working visit thereto, the user's operation efficiency degreases due to the large communication delay.

In this exemplary embodiment, when a user has logged in the virtual server of the overseas office 3, the virtual server of the overseas office 3 transmits a location information indicating the location of a base where the user has initially made access, to the virtual server of the Tokyo data center 2. Further, the virtual server of the Tokyo data center 2 performs switching of an actual-mode virtual server to a standby-mode virtual server existing at the nearest base from a base where the user has initially made access, on the basis of the location information having been received from the virtual server of the overseas office 3. Consequently, this method enables a user to be provided with a virtual desktop service by automatically allowing the user to access a virtual server which exists at the nearest base from a base where the user has initially made access and which provides the user with small server's response delay, and thus, this method enables realization of provision of comfortable server's responses to the user.

The outline of operation of the client server system 1 according to this exemplary embodiment of the present invention will be described with reference to FIG. 1.

A user, who is staying in a foreign country or the like for business, logs in to a standby-mode virtual server installed at a site office (the overseas office 3) from a PC installed at the overseas office 3 (S1). In response to the log-in having been made by the user, the virtual server of the overseas office 3 transmits a location information, which indicates a location of the PC with which the user has made the log-in, to the virtual server of the Tokyo data center 2 (S2). Upon reception of the location information having been transmitted by the virtual server of the overseas office 3, the virtual server of the Tokyo data center 2 performs collation of the location indicated by the location information. Subsequent to completion of the collation, the virtual server of the Tokyo data center 2 transmits a switching instruction information for instructing execution of switching to become an active-mode server from a standby-mode server, to the virtual server of the overseas office 3 which is the nearest site from the overseas office 3 (S3). In response to reception of the switching instruction information having been transmitted by the virtual server of the Tokyo data center 2, the virtual server of the overseas office 3 performs switching to become the active-mode server from the stand-by mode server (S4). Further, at the same time, the virtual server of the Tokyo data center 2 performs switching to become the standby mode server from the active-mode server.

Through this processing, the user becomes able to be provided with a virtual desktop service by accessing the virtual server of the overseas office 3, which provides small communication delay, from the PC of the overseas office 3. That is, it becomes possible to realize providing the user with comfortable server's responses, which lead to an improvement of operational efficiency of works performed by the user.

Figure 2:
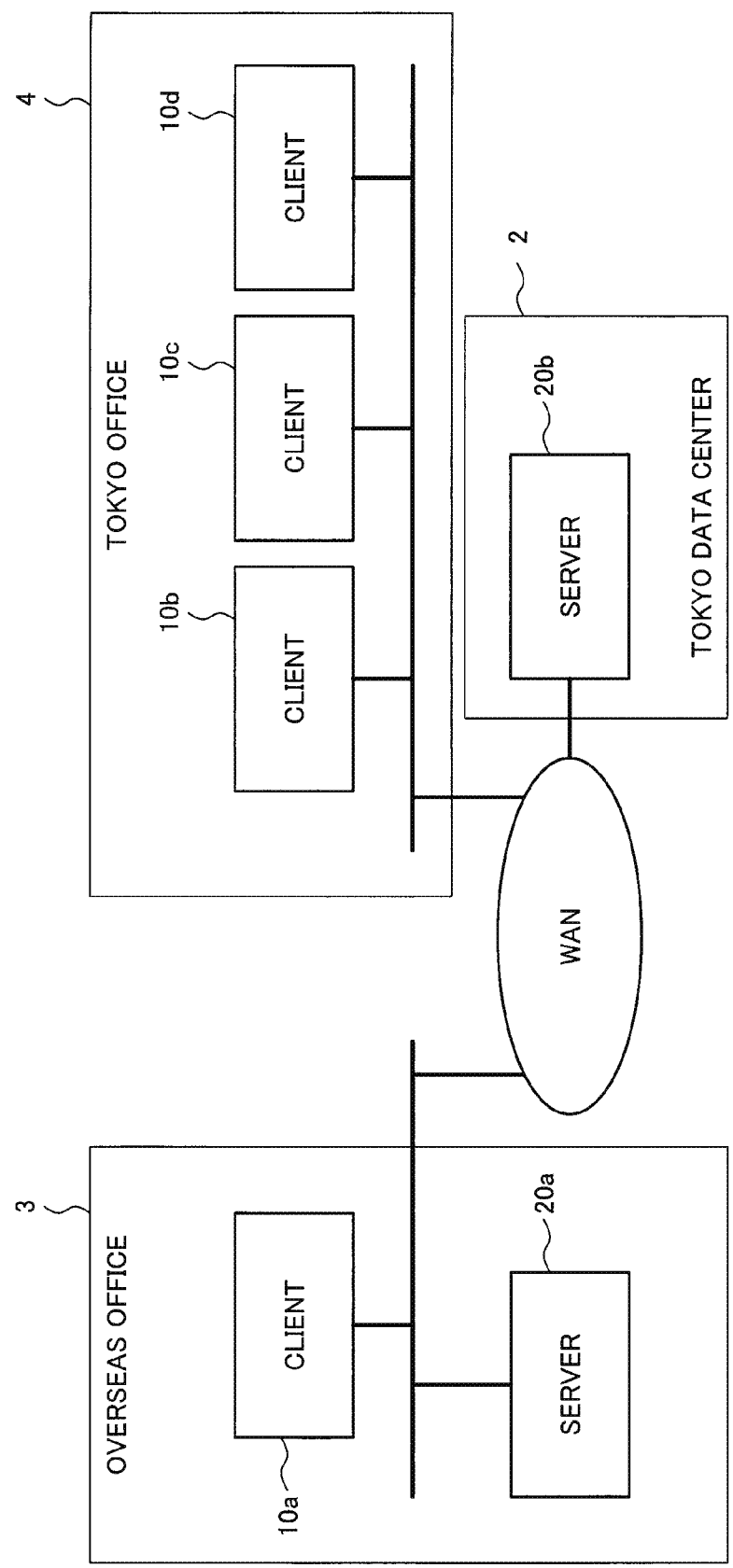
FIG. 2 is a block diagram illustrating a configuration of a client server system according to an exemplary embodiment of the present invention.

A configuration of the client server system 1 according to this exemplary embodiment of the present invention will be described with reference to FIG. 2. FIG. 2 is a block diagram illustrating a configuration of the client server system 1 according to this exemplary embodiment of the present invention.

The client server system 1 includes clients 10*a* to 10*d* and servers 20*a* and 20*b*. The client 10*a* and the server 20*a* are installed at the overseas office 3. The clients 10*b* to 10*d* are installed at the Tokyo office 4. The server 20*b* is installed at the Tokyo data center 2. That is, the server 20*a* operates as a virtual server of the overseas office 3. The server 20*b* operates as virtual server of the Tokyo data center 2. In addition, the number of bases as well as the number of clients and the number of servers in each of the bases are not limited to the numbers illustrated as examples here, and may be changed appropriately in accordance with a requirement.

The client 10*a* and the server 20*a* are connected to each other via a local area network (LAN) of the overseas office 3. The clients 10*b* to 10*d* are connected to one another via a LAN of the Tokyo office 4. The LAN of the overseas office 3, the LAN of the Tokyo office 4, and the server 20*b* are connected to one another via a wide area network (WAN). That is, the clients 10*a* to 10*d* and the servers 20*a* and 20*b* can communicate with one another via networks, that is, the LANs and the WAN. Here, as described above, the WAN is a leased line, the Internet, or the like.

Each of the clients 10*a* to 10*d* is an information processing device which is provided with a virtual desktop service from the server 20*a* or the server 20*b*. A user can utilize a virtual desktop environment provided by the server 20*a* or the server 20*b* by accessing the server 20*a* or the server 20*b* from any one of the clients 10*a* to 10*d*. Each of the clients 10*a* to 10*d* is, for example, a PC.

Each of the servers 20*a* and 20*b* is a virtual server which provides a virtual desktop service to each of the clients 10*a* to 10*d*. As described above, each of the servers 20*a* and 20*b* has a function of performing synchronous copying of database related to a virtual desktop environment from an active-mode server to a standby-mode server.

In addition, hereinafter, the clients 10*a* to 10*d* will also be collectively referred to as a "client 10", and the servers 20*a* and 20*b* will also be collectively referred to as a "server 20".

Figure 3:
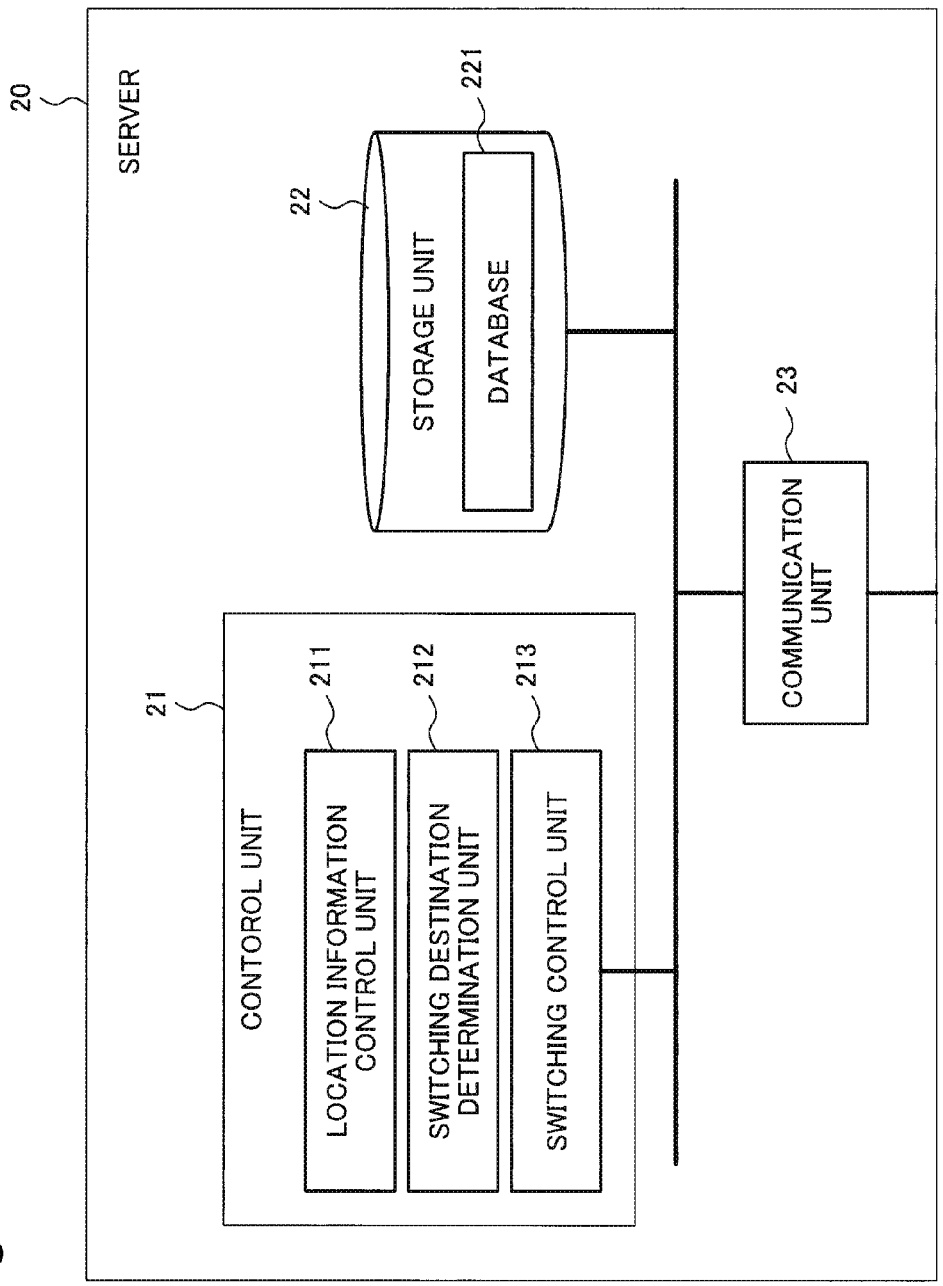
FIG. 3 is a block diagram illustrating a configuration of a server according to an exemplary embodiment of the present invention.

A configuration of the server 20 according to this exemplary embodiment of the present invention will be described with reference to FIG. 3. FIG. 3 is a block diagram illustrating a configuration of the server 20 according to this exemplary embodiment of the present invention.

The server 20 includes a control unit 21, a storage unit 22, and a communication unit 23. The control unit 21 also functions as a location information control unit 211, a switching destination determination unit 212, and a switching control unit 213.

The control unit 21 controls the whole of the server 20 in an integrated way. Specifically, the control unit 21 is realized by causing a central processing unit (CPU) included in the server 20 to execute a program which causes the CPU to execute processing for controlling the server 20 in an integrated way. Further, this program includes processing which causes the CPU to execute processes as the location information control unit 211, the switching destination determination unit 212, and the switching control unit 213.

In response to log-in from a client 10, the location information control unit 211 generates a location information indicating a location of the client 10, and transmits the location information to a server 20 in an active mode via the communication unit 23.

Through the location information having been transmitted by a server 20 which is different from a server 20 of interest here, the switching destination determination unit 212 determines a server 20 which exists at the nearest location from the location of the client 10, indicated by the location information, as a server 20 which becomes a destination of switching to a server in an active mode.

The switching control unit 213 generates a switching instruction information for instructing execution of switching, and transmits the switching instruction information to the server 20 having been determined as a destination of switching to a server operating in an active mode. Further, the switching control unit 213 is configured to, upon reception of a switching instruction information to a server 20 different from the self-server 20, carry out processing for switching the self-server 20 from an active-mode server to a standby-mode server. Moreover, the switching control unit 213 is configured to, upon reception of a switching instruction information from a server 20 different from the self-server 20, carry out processing for switching the self-server 20 from a standby-mode server to an active-mode server.

The storage unit 22 stores therein various data pieces used by the control unit 21, programs executed by the control unit 21, and the like.

Further, the storage unit 22 includes a database 221 related to virtual desktop environments utilized by clients 10. That is, the control unit 21 updates the database 221 in conjunction of the utilization of a virtual desktop by a client 10. That is, in the database 221, data pieces dealt with in each user's virtual desktop environment are included. Further, the control unit 21 is configured to, while the self-server 20 is operated as an active-mode server, in response to updating of its database 221 in conjunction with the utilization of a virtual desktop environment by a user, cause the updating of the database 221 to be synchronized with updating of a database 221 of each server 20 different from the self-server 20, which operates as a standby-mode server.

The communication unit 23 transmits various data pieces output from the control unit 21 to the clients 10 or servers 20 different from the self-server 20. The communication unit 23 receives various data pieces transmitted from the clients 10 or servers 20 different from the self-server 20, and outputs the received data pieces to the control unit 21. That is, specifically, the communication unit 23 is a communication device which performs transmitting and receiving of data pieces between a server 20 side and a network side while concurrently performing conversion of the formats of the data pieces so that the data pieces can be processed at each of the server 20 side and the network side.

Figure 4:
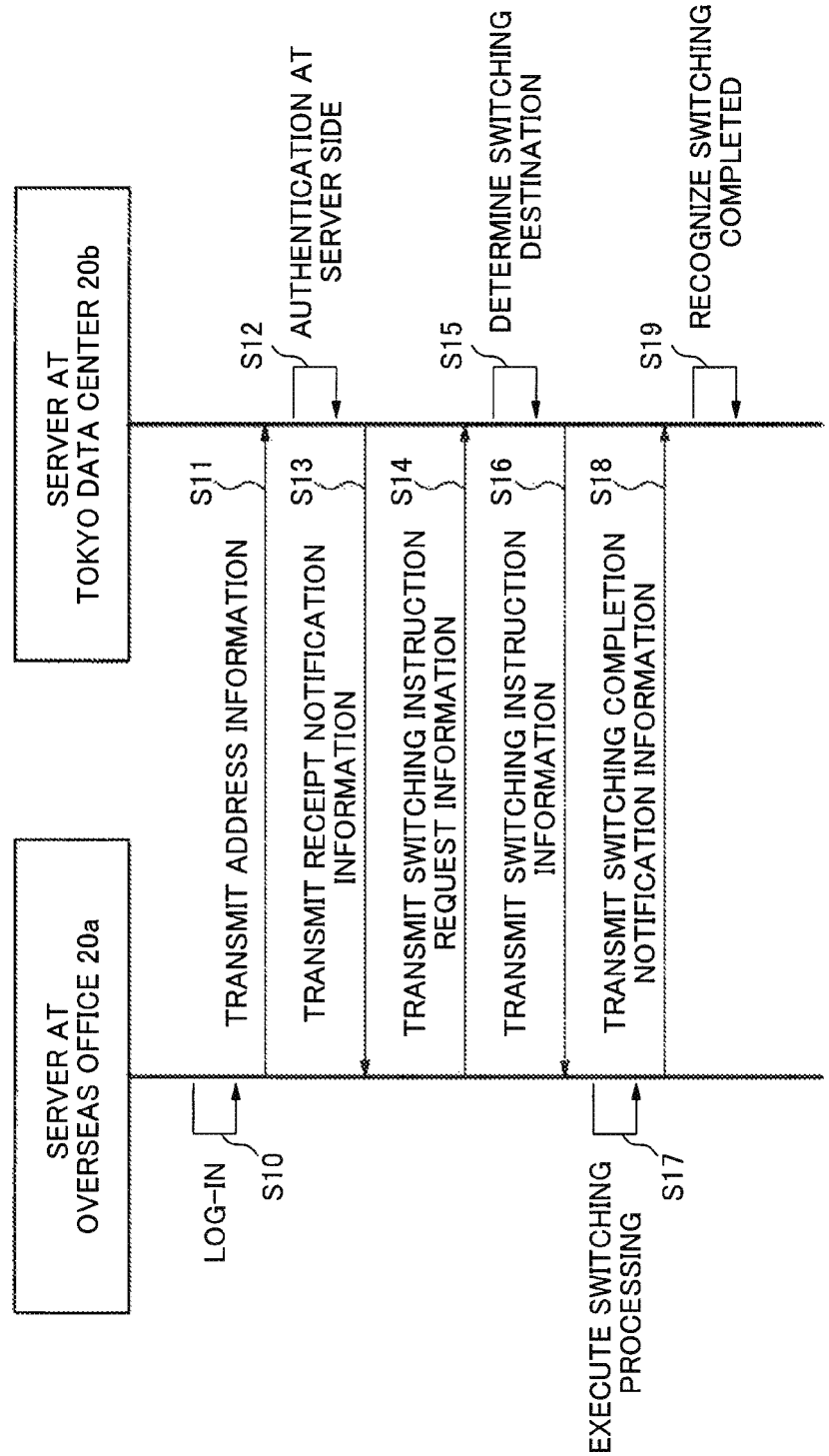
FIG. 4 is a sequence diagram illustrating processing of a client server system according to an exemplary embodiment of the present invention.

Processing for the client server system according to this exemplary embodiment of the present invention will be described with reference to FIG. 4. FIG. 4 is a sequence diagram illustrating processing for the client server system according to this exemplary embodiment of the present invention.

In response to an input for requesting a log-in to the server 20a from a user who desires to utilize a virtual desktop environment, the client 10a of the overseas office 3 generates a log-in request information for requesting a log-in to the server 20a and transmits the log-in request to the server 20a. The log-in request information includes information required for log-in authentication, such as a user ID and a password. In response to reception of the log-in request information having been transmitted from the client 10a, the server 20a performs log-in authentication on the basis of the log-in request information (S10). In addition, as a method for the log-in authentication above, it is possible to employ a general authentication method, such as a method in which a log-in is authenticated in accordance with a result of collating each of a user ID, a password, and the like indicated by the log-in request information with a corresponding one of given expected values.

In the case where it is determined that the log-in from the client 10a is valid, the location information control unit 211 of the server 20a generates an address information indicating an Internet protocol (IP) address of the client 10a, as a location information, and transmits the address information to the server 20b which is an standby-mode server via the communication unit 23 (S11). Here, for example, the location information control unit 211 may acquire the IP address of the client 10a from an IP header of an IP packet having been used for the transmission of the log-in request information from the client 10a.

The location information control unit 211 of the server 20b receives the address information having been transmitted from the server 20a via the communication unit 23. The location information control unit 211 performs authentication with respect to whether or not the received address information is a valid address information having been transmitted from the real server 20a (S12). This authentication may be performed by determining whether or not an IP address indicated by an IP header of an IP packet having been used for the transmission of the address information from the server 20a coincides with an IP address of the server 20a. Further, the authentication may be performed such that the location information control unit 211 of the server 20a transmits an information uniquely indicating the server 20a to the server 20b, together with the address information, and the location information control unit 211 of server 20b determines whether or not the information having been received from the server 20a indicates the server 20a.

In the case where it is determined that the received address information is a valid address information having been transmitted from the real server 20a, the location information control unit 211 of the server 20b generates a receipt notification information for notifying the receipt of the location information, and transmits the receipt notification information to the server 20a via the communication unit 23 (S13).

The switching control unit 213 of the server 20a receives the receipt notification information having been transmitted from the server 20b via the communication unit 23. In response to the reception of the receipt notification information, the switching control unit 213 of the server 20a generates a switching instruction request information for requesting issue of an instruction for instructing execution of switching between an active-mode server and a standby-mode server, and transmits the switching instruction request information to the server 20b via the communication unit 23 (S14).

The switching destination determination unit 212 of the server 20b receives the switching instruction request information having been transmitted from the server 20a. In response to the reception of the switching instruction request information, the switching destination determination unit 212 of the server 20b determines the nearest server 20 from the client 10a as a destination of switching to an active-mode server (S15). In this example described here, the server 20a, which is the nearest server 20 from the client 10a, is determined as the destination of switching to an active-mode server.

Here, with respect to the nearest server 20 from the client 10, it is supposed here that an information set which makes it possible to identify the nearest server 20 from the client 10 on the basis of the IP address of the client 10 is stored in the storage unit 22 in advance. Further, it is also supposed here that through reference of the information set above, the switching destination determination unit 212 is capable of identifying the nearest server 20 on the basis of the IP address indicated by the address information. The information set above may be a set of information each related to a range of IP addresses allocated to a certain area, and the server 20 existing in the area. That is, as this range of IP addresses, for example, a range of IP addresses allocated to, for example, Regional Internet Registry (RIR), National Internet Registry (NIR), Local Internet Registry (LIR), or the like, may be employed.

Specifically, a set of shortest-distance route information each related to a range of IP addresses and a particular server 20 is stored in the storage unit 22 in advance. This particular server 20 is a server 20 at which a client 10 existing in a region corresponding to the range of IP addresses arrives via a shortest-distance route. In addition, the particular server 20 may also be a server 20 existing in the region corresponding to the range of IP addresses. Further, from among the set of shortest-distant route information, the switching destination determination unit 212 selects a server 20 related to a range of IP addresses within which an IP address indicated by the address information having been received in step S12 falls. Further, the switching destination determination unit 212 determines the selected server 20 as a switching destination server 20.

In addition, a server 20 at which a client 10 existing in a region corresponding to the range of IP addresses arrives via a shortest-distance route may be made, for example, a server 20 whose response time is minimum. That is, a server 20, whose response time is the smallest one among response times each having been measured in advance in access from the relevant client 10 existing in the region to a corresponding one of comparison target servers 20, may be selected as a switching destination server 20. As a further option, a server 20 whose response time is minimum in theory may be selected.

The switching control unit 213 of the server 20b carries out switching processing for causing the server 20b itself to become a standby-mode server from an active-mode serve. Simultaneously therewith, the switching control unit 213 of the server 20b generates a switching instruction information for instructing execution of switching between an active-mode server and a standby-mode serve, and transmits the switching instruction information to the server 20a having been determined as a destination of switching to an active-mode server via the communication unit 23 (S16).

The switching control unit 213 of the server 20a receives the switching instruction information having been transmitted from the server 20b via the communication unit 23. In response to the reception of the switching instruction information, the switching control unit 213 of the server 20a carries out switching processing for causing the server 20a itself to become an active-mode server from a standby-mode server (S17). Through this processing, the server 20a begins operation as an active-mode server and begins synchronization processing for causing updating of the database 221 of the server 20a to be synchronized with updating of the database 221 of the server 20b which operates as a standby-mode server for backing up data pieces stored in the database 221 of the server 20a. After the completion of switching to an active-mode server, the switching control unit 213 of the server 20a generates a switching completion notification information for notifying the completion of the switching, and transmits the switching completion information to the server 20b via the communication unit 23 (S18).

The switching control unit 213 of the server 20b receives the switching completion notification information having been transmitted from the server 20a via the communication unit 23. Through the reception of the switching completion notification information, the switching control unit 213 of the server 20b recognizes that the server 20a has successfully completed the switching (S19).

As described above, according to this exemplary embodiment, a user can cause the server 20a, which is the nearest server 20 from the user, to operate as an active-mode server merely by logging in to the server 20a. Though this method, whichever of bases a user visits, the user can always work while making access to the nearest server from the user. Thus, the user becomes able to work under the environment where the delay of server's responses is prevented and, as a result, the speed of the user's work is improved. When a user has logged-in to a server, the server transmits a location information related to the server to a server operating as an active-mode server and the nearest server from the user is automatically switched to a new active-mode server. Thus, a user can work without caring about the active mode/ standby mode.

For example, when a staff belonging to an enterprise operating in cooperation with a company incorporated abroad makes a business trip to the company incorporated abroad and utilizes an in-company client server system, the user can also work on site under the environment where server's response delay is improved to a degree equal to the degree of server's response delay the user experiences during works using the same in-company client server system in Japan. As described above, in this exemplary embodiment, it is possible to, whichever of bases a user visits, automatically provide the user with a virtualized desktop service with comfortable server's responses without causing the user to worry about the delay of the server's responses.

Figure 5:
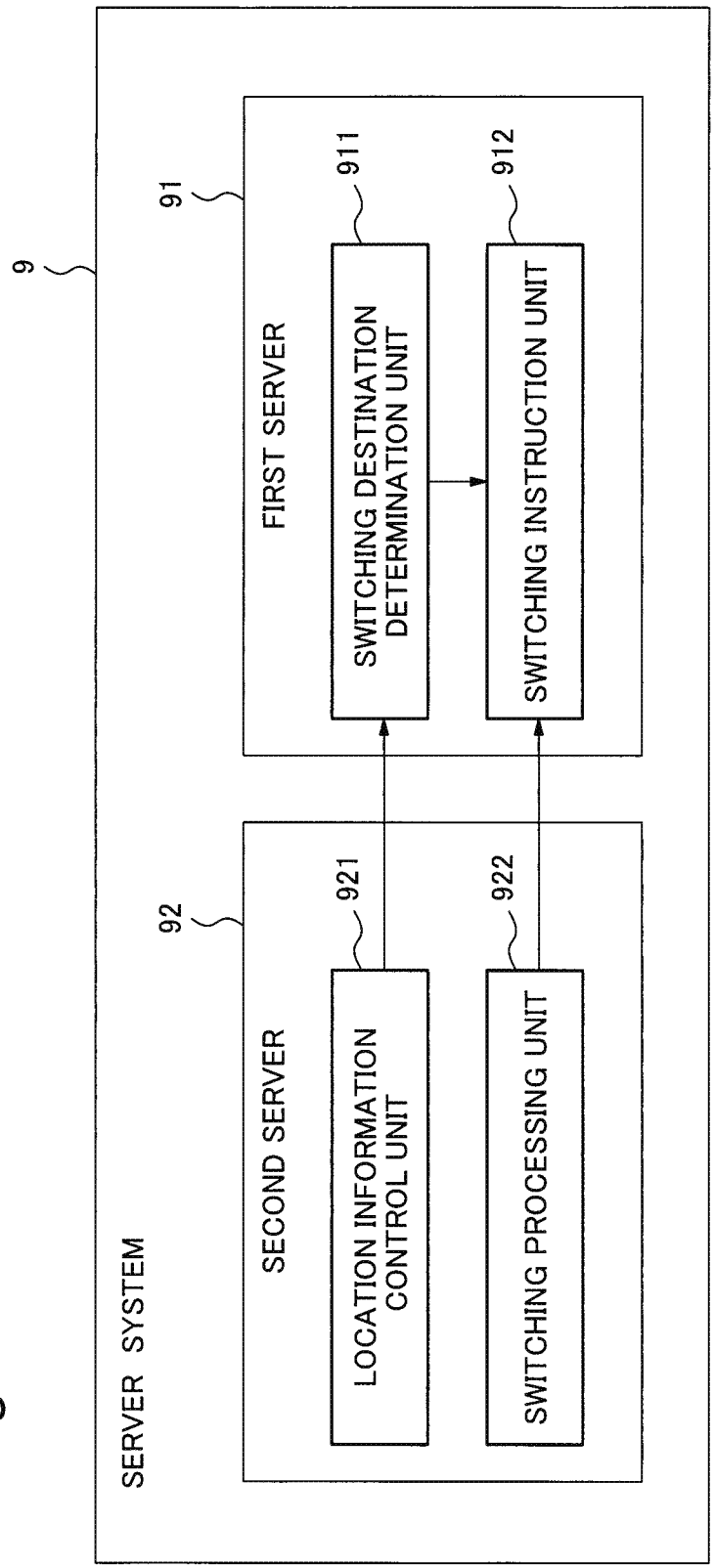
FIG. 5 is a block diagram illustrating a configuration of a server system as a summary of a client server system according to an exemplary embodiment of the present invention.

A configuration of a server system 9, which is a summary of the client server system 1 according to this exemplary embodiment of the present invention, will be described with reference to FIG. 5. FIG. 5 is a block diagram illustrating a configuration of a server system 9 which is a summary of a client server system according to this exemplary embodiment of the present invention.

The server system 9 includes a first server 91 and a plurality of second servers 92. In addition, in FIG. 5, a second one and subsequent ones of the second servers 92 are omitted from illustration.

The first server 91 operates as an active-mode server. The first server 91 includes a switching destination determination unit 911 and a switching instruction unit 912. The second server 92 operates as a standby-mode server associated with the first server. The second server 92 includes a location information control unit 921 and a switching processing unit 922.

Through the use of a location information having been transmitted from the second server 2, the switching destination determination unit 911 determines, as a destination of switching, the second server 92 which is nearer than the first server 91 (the self-server) from a client existing at a location indicated by the location information. The switching destination determination unit 911 corresponds to the switching destination determination unit 212. The switching instruction unit 912 transmits a switching instruction information to the second server 92 which has been determined as a switching destination by the switching destination determination unit 911. The switching instruction unit 912 corresponds to the switching control unit 213.

In response to access from a client, the location information control unit 921 transmits a location information indicating the location of the client to the first server 91. The location information control unit 921 corresponds to the location information control unit 211. Upon reception of the switching instruction information having been transmitted from the first server 91, the switching processing unit 922 switches the second server 92 (the self-server) from a standby-mode server to an active-mode server. The switching processing unit 922 corresponds to the switching control unit 213.

It is to be noted here that the present invention is not limited to the aforementioned exemplary embodiments and can be modified as needed within a range not departing from the gist of the present invention. For example, modifications described below can be made.

In the aforementioned exemplary embodiment, the description has been made by way of an example in which a location indicated by a location information is an IP address, but the location indicated thereby is not limited to the IP address. For example, a configuration may be made such that an information which is a substitution for the IP address and which indicates the location of the client 10 on the basis of a prescribed rule is transmitted to a server, and causes the server to utilize this information as a location information. In addition, in this case, through the use of the information above, the nearest server 20 from the client 10 existing at a location indicated by the information above may be stored in the storage unit 22 in advance, and a server which is to become a switching destination may be determined on the basis of the stored information, in the same way as described above.

In the aforementioned exemplary embodiment, the server 20 transmits a location information in response to receipt of a log-in from the client 10, but the timing of transmitting a location information (that is, timing for triggering switching between an active-mode server and a standby-mode server) is not limited to such timing of the receipt of the log-in from the client 10. In response to a certain kind of access, which has been determined by an administrator of the server 20 in accordance with a requirement, a location information may be transmitted (that is, switching between an active-mode server and a standby-mode server may be performed).

In the aforementioned exemplary embodiment, in response to reception of a request for requesting issue of an instruction for switching, the server 20b operating as an active server determines a switching destination and issues the instruction for switching, but the trigger of the determination of the switching destination and the issue of the instruction for switching is not limited to the above-described trigger. For example, the determination of the switching destination and the issue of the instruction for switching may be performed in response to reception of a location information.

In the aforementioned exemplary embodiment, the description has been made by way of an example in which the present invention is applied to a virtual server which provides a virtual desktop environment, but the present invention is not limited to this example. For example, the present invention may be applied to a database server. That is, when a user accesses a database on the cloud and refers to data from a place outside their office, server's response delay may be prevented in the same way as described above. That is, when an access to a database server operating as a standby-mode server is made by a client, comfortable server's responses may be provided to the client by switching the nearest server from the client to an active-mode server from a standby-mode server.

In the aforementioned exemplary embodiment, the server 20b, the nearest server from a client having accessed the server 20b, is determined as a switching destination server 20, but the present invention is not limited to this method. That is, any other method, which makes it possible to determine, as a switching destination, a standby-mode server 20 whose location is nearer the client than the location of a server 20 currently operating as an active-mode server, may be employed. For example, in the case where, when a server at the Tokyo data center is operating as an active-mode server, a server existing in a foreign country is accessed by a client, any one of a plurality of standby-mode servers existing in the foreign country may be determined as a switching destination. In addition, in this case, there occurs a case where a server 20 having been accessed by a client 10 does not receive any switching instruction information even though, for example, a predetermined period of time has elapsed (this case occurs in the case where another server 20 has been switched to an active-mode server). In this case, the server 20 having been accessed by the client 10 may cause the client 10 to display a message for notifying a situation in which the client 10 is not in the state of logging in the nearest server 20 from the client 10 by transmitting an information for notifying such a situation, and then may cause the client 10 to automatically log out, or the like.

It is possible to supply programs executed in the server (computer) according to the aforementioned embodiment to the server (computer) by using any of various types of non-transitory computer readable media, which contains the programs. Such non-transitory computer readable media include various types of tangible storage media. Well-known examples of non-transitory computer readable media include magnetic recording media (such as a flexible disc, a magnetic tape, and hard disk drive), magneto-optic recording media (such as a magneto-laser disk), a CD Read Only Memory (ROM), CD-R, CD-R/W, and semiconductor memory (such as mask ROM, Programmable Rom (PROM), Erasable PROM (EPROM), flash ROM, and Random Access Memory (RAM)).

Further, the programs may be supplied to the computer by using any of various types of transitory computer readable media. Well-known examples of transitory computer readable media include an electric signal, a light signal, and electromagnetic wave. Such transitory computer readable media can supply the programs to the computer via a wireless communication link or a wired communication link realized by an electric wire, an optic fiber, or the like.

Hereinbefore, the present invention has been described with reference to an exemplary embodiment, but the present invention is not limited to the aforementioned exemplary embodiment. Various changes understandable by those skilled in the art can be made on the configuration and the details of the present invention within the scope of the present invention.

This application is based upon and claims the benefit of priority from Japanese patent application No. 2012-137858, filed on Jun. 19, 2012, the disclosure of which is incorporated herein in its entirety by reference.

REFERENCE SIGNS LIST

1: Client server system
2: Tokyo data center
3: Oversea office
4: Tokyo office
9: Server system
10, 10a, 10b, 10c and 10d: Client
20, 20a and 20b: Server
21: Control unit
22: Storage unit
23: Communication unit
91: First server
92: Second server
211 and 921: Location information control unit
212 and 911: Switching destination determination unit
213: Switching control unit
221: Database
912: Switching instruction unit
922: Switching processing unit

The invention claimed is:

1. A server system comprising servers for providing virtual desktop environments to clients, wherein each of the servers is configured to operate in an active mode when accessed by a client to provide a service for the client or in a standby mode in order to back up data stored in one of the servers operating in the active mode, and wherein each of the servers comprises a memory storing instructions and a processor that, when executing the instructions, is configured to:
when in the standby mode:
in response to an access from a client, transmit location information which indicates a location of the client to a server operating in the active mode; and
upon reception of switching instruction information transmitted from the server operating in the active mode, perform switching so as to change modes from the standby mode to the active mode; and
when in the active mode:
on the basis of location information transmitted from a server operating in the standby mode, determine, as a switching destination, a server operating in the standby mode which is positioned at a location which is nearer a location of a client, as indicated by the location information, than the location of the server receiving the location information; and
transmit switching instruction information to a server which operates in the standby mode and which is determined as the switching destination.

2. The server system according to claim 1, wherein the location information indicates an IP address of the client as the location of the client.

3. The server system according to claim 2,
wherein each of the servers is further configured to, when in the active mode, store therein, in advance, at least one shortest distance route information related to a range of at least one IP address and a server in the standby mode of the plurality of servers and which reaches a client whose IP address falls within the range of at least one IP address via a shortest distance route, and
wherein a server related to a range of the IP address which includes an IP address indicated by the location information is selected from the shortest distance route information to be the switching destination.

4. The server system according to claim 1, wherein each of the servers is further configured to, when in the standby mode, transmit location information to a server in the active mode in response to a login from the client.

5. The server system according to claim 1, wherein each of the servers is further configured to, when in the active mode, cause servers in the standby mode to back up, on a synchronization basis, data in a server in the active mode.

6. A server that operates in an active mode when accessed by a client to provide a service for the client, or in a standby mode in order to back up data stored in another server which operates in the active mode, the server comprising:
a memory storing instructions; and
a processor that, when executing the instructions, is configured to:
when in the standby mode:
in response to an access from a client, transmit location information which indicates a location of the client to a server which operates in the active mode; and
upon reception of switching instruction information transmitted from a server which operates in the active mode, perform switching so as to cause the server itself to change its mode from the standby mode to the active mode; and when in the active mode:
on the basis of location information transmitted from a server which operates in the standby mode, determine, as a switching destination, a server which operates in the standby mode and which is positioned at a location which is nearer a location of a client, as indicated by the location information, than a location of the server itself; and
transmit switching instruction information to a server which operates in the standby mode and which is determined as the switching destination.

7. A server control method controlling a server which operates in an active mode when accessed by a client to provide a service for the client, or in a standby mode in order to back up data stored in another server which operates in the active mode, the server control method comprising:
in the standby mode,
in response to an access from a client, transmitting a location information which indicates a location of the client to a server which operates in the active mode;
in the standby mode, upon reception of a switching instruction information transmitted from a server which operates in the active mode, perform switching so as to cause the controlled server itself to change its mode from the standby mode to the active mode;
in the active mode,
on the basis a location information transmitted from a server which operates in the standby mode, determining, as a switching destination, a server which operates in the standby mode and which is positioned at a location which is nearer a location of a client, which is indicated by the location information, than a location of the controlled server itself; and
in the active mode, transmitting a switching instruction information to a server which operates in the standby mode and which is determined as a switching destination.

8. A non-transitory computer readable medium that stores therein a server control program controlling a server which operates in an active mode when accessed by a client to provide a service for the client, or in a standby mode in order to back up data stored in another server which operates in the active mode, such that the server which operates in an active mode or in a standby mode executes processing comprising the processing of:

in the standby mode, in response to an access from a client, transmitting a location information which indicates a location of the client to a server which operates in the active mode;

in the standby mode, upon reception of a switching instruction information transmitted from a server which operates in the active mode, perform switching so as to cause the controlled server itself to change its mode from the standby mode to the active mode;

in the active mode, on the basis a location information transmitted from a server which operates in the standby mode, determining, as a switching destination, a server which operates in the standby mode and which is positioned at a location which is nearer a location of a client, which is indicated by the location information, than a location of the controlled server itself; and in the active mode, transmitting a switching instruction information to a server which operates in the standby mode and which is determined as a switching destination.

\* \* \* \* \*